(12) United States Patent
Miller (10) Patent No.: US 7,099,620 B2
(45) Date of Patent: Aug. 29, 2006

(54) METHOD AND APPARATUS FOR ADMINISTERING AN INTERNET BASED EXAMINATION TO REMOTE SITES

(75) Inventor: David Russell Miller, Ottawa (CA)

(73) Assignee: Medical Council of Canada, Ottawa (CA)

( * ) Notice: Subject to any disclaimer, the term of this patent is extended or adjusted under 35 U.S.C. 154(b) by 0 days.

(21) Appl. No.: 10/978,882

(22) Filed: Nov. 1, 2004

(65) Prior Publication Data
US 2005/0095571 A1 May 5, 2005

Related U.S. Application Data

(63) Continuation of application No. 09/667,954, filed on Sep. 22, 2000, now abandoned.

(51) Int. Cl.
*G09B 3/00* (2006.01)
(52) U.S. Cl. ............... 434/350; 434/322; 434/362
(58) Field of Classification Search ......... 434/118, 434/219, 307 R, 322, 323, 350, 362, 365, 434/65, 354; 463/1, 42; 705/1, 10; 709/223, 709/224; 726/12
See application file for complete search history.

(56) References Cited

U.S. PATENT DOCUMENTS

| | | | |
|---|---|---|---|
| 4,486,180 A * | 12/1984 | Riley ..................... 434/65 |
| 5,059,127 A | 10/1991 | Lewis et al. | |
| 5,204,813 A | 4/1993 | Samph et al. | |
| 5,779,549 A * | 7/1998 | Walker et al. .............. 463/42 |
| 5,827,070 A | 10/1998 | Kershaw et al. | |
| 5,841,655 A | 11/1998 | Stocking et al. | |
| 5,915,973 A * | 6/1999 | Hoehn-Saric et al. ....... 434/350 |
| 5,947,747 A * | 9/1999 | Walker et al. ............. 434/354 |
| 5,999,908 A * | 12/1999 | Abelow ..................... 705/1 |
| 6,000,945 A | 12/1999 | Sanchez-Lazer et al. | |
| 6,052,512 A | 4/2000 | Peterson et al. | |
| 6,056,556 A | 5/2000 | Braun et al. | |
| 6,102,406 A | 8/2000 | Miles et al. | |
| 6,112,049 A | 8/2000 | Sonnenfeld | |
| 6,161,137 A * | 12/2000 | Ogdon et al. ............... 709/224 |

(Continued)

FOREIGN PATENT DOCUMENTS

JP 2002006733 A * 1/2002

OTHER PUBLICATIONS

Building an Internet-Based Examination For the MCC: Issues and Progress, ECHO Mar. 1998, pp. 5-7.

(Continued)

*Primary Examiner*—Joe H. Cheng
(74) *Attorney, Agent, or Firm*—Pearne & Gordon LLP (57) ABSTRACT

A method and system for administering a secure, Internet based examination at remote sites is disclosed. The examination is dynamic and potentially adaptive. During the examination session, the state of the examination is maintained with the use of cookies, which are updated and stored on the central server at a predefined interval during the examination. Individual examination sessions may be restored to their previous state in the event of a malfunction.

24 Claims, 7 Drawing Sheets

U.S. PATENT DOCUMENTS

| | | | |
|---|---|---|---|
| 6,201,948 B1 | 3/2001 | Cook et al. | |
| 6,332,163 B1 | 12/2001 | Bowman-Amuah | |
| 6,434,572 B1 | 8/2002 | Derzay et al. | |
| 6,507,726 B1 | 1/2003 | Atkinson et al. | |
| 6,532,334 B1 | 3/2003 | Kikuchi et al. | |
| 6,615,258 B1 * | 9/2003 | Barry et al. | 709/223 |
| 6,659,861 B1 * | 12/2003 | Faris et al. | 463/1 |
| 6,704,873 B1 * | 3/2004 | Underwood | 726/12 |
| 6,741,967 B1 * | 5/2004 | Wu et al. | 705/10 |

OTHER PUBLICATIONS

Building an Internet-Based Examination For the MCC: Issues and Progress. Part 2 ECHO Jun. 1998, pp. 3-5.

MCC Readies a New, Computerized Medical Qualifying Exam, 1999 Canadian Medical Association or its Licensors, CMAJ Nov. 30, 1999 161 (11).

Information Pamphlet Computer-Based Testing—Computer-Based Medial Council of Canada Qualifying Examination Part 1, Jun. 14, 1999, pp. 1-111 and 1-11.

* cited by examiner

MCC Exam
Section 1 of 7

Switch to French

3:27:22
Time remaining in exam

Questions:
1 2 3 4 5 6 7
8 9 10 11 12 13 14
15 16 17 18 19 20 21
22 23 24 25 26 27 28

Normal values
Normal values for most common laboratory tests

Calculator
Online calculator

Check your answers before clicking "Submit."
Submit

8. ☐ [Illustration] The 2-year-old child shown in the referenced illustration was left alone in a kitchen and later was discovered to have mouth and tongue lesions as shown. Various cleaning materials left under the kitchen sink were noted spilled over the floor. Which one of the following investigations is the most appropriate?
   ○ Evaluation of gastric contents by gastric lavage
   ○ Upper gastrointestinal series under fluoroscopy
   ● Indirect laryngoscopy
   ○ Visualizations of the posterior pharyngeal wall
   ○ Esophagoscopy 9. ☑ A 72-year-old man is referred to the surgery clinic because of dysuria and frequency. Each of the following physical findings would suggest benign prostatic hypertrophy as the cause EXCEPT
   ○ clear urine.
   ○ irregularity of the prostatic capsule.
   ○ a distended urinary bladder.
   ○ inability to pass a urinary catheter.
   ○ enlargement of the prostate.

Figure 9

METHOD AND APPARATUS FOR ADMINISTERING AN INTERNET BASED EXAMINATION TO REMOTE SITES

This application is a continuation of U.S. patent application Ser. No. 09/667,954, filed on Sep. 22, 2000, now abandoned, the subject matter of which is incorporated in its entirety by reference herein.

FIELD

The invention relates generally to the field of computer based testing and more particularly to a method and apparatus for administering an Internet based examination to remote sites.

BACKGROUND

Administer an examination to measure a candidate's qualifications has become standard in almost all professions. Generally, the process of administering a written examination, and reviewing the test results extends over a period of several months. The examination procedure includes pre-printed examination papers and printed test results, which contribute to the expense and inefficiency of written examinations.

Computer based testing has grown in popularity in the past few years. Computer based testing (CBT) simply means a test situation where the candidate utilizes a computer terminal rather a printed examination. Generally, the questions appear on the screen and the candidate answers them by typing at the keyboard or clicking a mouse on the appropriate answer. This format has a number of advantages over the conventional paper and pencil examination.

Candidates complete CBT examinations with much more speed and efficiency than conventional examinations. This is due to the inherent ease of clicking with a mouse. Also, the candidate is not required to constantly shift his eyes from question sheet to answer sheet.

Perhaps the most compelling advantage of CBT is its inherent flexibility—the design and format can be easily modified to adapt different circumstances. Customization to meet special needs is possible.

video, etc. can all be used to enhance the testing experience.

The most obvious difference between traditional testing and CBT is that a computer based examination's content can be generated in real time according to some set criteria. This means that each candidate might receive the same questions in a different order or perhaps even a different examination altogether.

CBT examinations also provide more options in reporting results. The raw scores and processed results can be provided in whatever format is desired.

In addition, CBT results in cost savings in printing, storing, distribution and collecting examinations.

Following the introduction of the Internet, computer based testing evolved into Internet based testing (IBT). In Internet based testing, the candidate is seated at a computer that is connected to the Internet. Usually, the software running is a World Wide Web (WWW) browser such as Netscape Navigator® or Microsoft Internet Explorer®. A connection is established with a remote web server which sends to the browser a series of web pages. Again the candidate answers by clicking the mouse or entering information at the keyboard. By submitting the answers, the candidate sends the answers back to the web server for processing and the process continues.

IBT offers further advantages from CBT. The Internet and especially the WWW is well suited to the delivery of multimedia content. Designed to be easy to navigate and to incorporate a variety of multimedia elements the Web has become virtually synonymous with the Internet in the public eye. The point and click approach to navigation on the WWW lends itself extremely well to an examination situation. Modern universities all have computer labs full of Internet-enabled computers and candidates enjoy the convenience of taking the examination using existing university facilities instead of travelling to outside centres. By electing to use the Internet as the vehicle for its examination, the testing organization will be able to assert greater control over the process and will not have to contract with a private testing institution.

While the Internet has undergone explosive growth in the past few years, in many ways it is still at an early stage of development. Therefore, there are still many development issues for IBT.

Problems with IBT include security, user interaction and reliability.

Imposing security on Internet transactions means taking specific steps to plug security holes and using software to make it as difficult as possible to intercept transmissions. There are three main areas where security must be imposed. The first is at the server, by monitoring incoming and outgoing traffic to ensure only legitimate transactions are allowed. The second is on the client side, by proctoring for the log in, ensuring that candidates can not store information about the examination. The third area is during transmission, by encrypting transactions to prevent monitoring by intruders.

The WWW is designed to be a non-linear medium. Hypertext links allow users to follow any topic of interest at any time and to easily retrace their steps whenever they want. An examination, however, is inherently liner. It starts at a specific time and ends at a specific time. More importantly, a candidate should not be able to click the back button, change answers already submitted and then proceed to another section of the examination.

IBT also should be easy to use, particularly considering that some candidates will have had little to no prior exposure to computers. Therefore, the user interface should be designed to be user friendly and intuitive.

It is also important to ensure that the examination is reliable. The examination should continue to function in the event that the candidate does something unpredictable or if some kind of technical malfunction occurs. It is almost inevitable that technical problems could arise. In this event, a mechanism must be provided to restore the examination to a previously computed state so that the candidate's work is not for naught.

For example, there is the prospect of a power failure. In this situation, candidates should be able to pick up where they left off at some later time. A power failure could also affect the server or the server could experience a technical malfunction.

Therefore, there is a need for an improved method of computer based testing that addresses the above mentioned problems.

SUMMARY

The invention is directed to an application that runs in a web browser using an Internet connection, with dynamic content delivered from a web server to perform web based testing. The invention addresses the following problems: conducting high stakes examinations over the Internet, implanting adaptive testing model in an Internet based examination, and maintaining integrity of examination content and responses. Integrity is maintained since questions are answers are securely transmitted, answers cannot be resubmitted and since answers are not lost during a computer or network outage.

In one embodiment, the IBT will be used by a testing organization to administer various types of exams. The organization may represent any organization requiring to audit the skills and abilities of candidates. It is important that a candidate be able to demonstrate basic knowledge and abilities, since instruction and training vary from school to school for a number of industries, fields and professions. One example is the Medical Council of Canada, which may use the invention to administer the Medical Council of Canada Qualifying Examination (MCCQE) Part 1.

Some of the advantages that may be realized by embodiments of the present invention are:

- The adaptive testing method of the application will allow for a shorter examination. For example, the current two day MCCQE Part 1 examination may be reduced to a one day examination.
- The multimedia abilities means that the testing organization be able to keep pace with new instructional techniques and materials as more and more educational institutions introduce multimedia into the curriculum.
- Multiple examination administrations will now be possible. For example currently, the MCCQE Part I is administered once annually in Spring. The Internet based MCCQE Part I could be administered once in the Spring and once in the Fall. Many candidates and licensing authorities will benefit from the increased flexibility as to when a candidate can schedule an examination.
- Candidates can schedule their own examinations. Candidates will be able to select the date that want to take the exam from a menu of dates at their chosen location.
- The use of a computer will allow better control of text question exposure than the current paper and pencil examinations.

According to an embodiment of the invention, there is provided a method and apparatus for Internet based testing wherein the current state of the examination session is automatically saved at predefined intervals. The current state is saved in a unique file which is on the web server. The current state is saved by transmitting cookies between the web server and the client computer to save the current state of the examination.

According to another embodiment of the invention, there are provided a user interface invocable by an application program for administering a computer based exam comprising: a right frame for displaying at least one question; a left frame comprising: a listing of question numbers; a user activable button for a calculator; and a user activable button for a clock, the clock being adapted to either display real time, examination time elapsed or examination time remaining.

According to other embodiments of the invention, there is provided a computer executable software code stored on a computer readable medium for administering a computer based examination having examination content; a programmed computer for administering a computer based examination having examination content; and a computer readable medium having computer executable software code for administering a computer based examination including: code to receive a candidate specific user name and PIN; code to retrieve and display the examination content from a remote site; code to begin the examination; code to update cookie content during the examination at a predefined interval; and code to transmit a request to a web server, the request including the updated cookie content; code to receive a request from a client computer during the examination, the request including cookie content; code to return a response to the client computer indicating the currently displayed content should not be changed; and code to store the cookie content in a unique cookie jar file.

According to anther embodiment of the invention, there is provided a Internet based testing system including security means.

According to another embodiment of the invention, there is provided an adaptive testing method.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

Following is a detailed description of the preferred embodiment of the present invention. However, it should be noted that the present invention encompasses a number of alternatives that could be chosen. One skilled in the art will recognize these alternatives as falling within the scope of the invention. While the present invention is stated to be preferably suited for the MCCQE Part I Exam, the invention can be used in any such testing environment and may utilize any variation of the features described below.

This invention includes features and/or components that have been invented and selected for their individual and combined benefits and superior performance for computer based testing. The system includes multiple aspects that individually and collectively provide new and novel features in and of themselves. Each of the individual components or process, however, works in association with and is optimally mated to the others. Together they yield an overall system and method for computer based testing that has superior collective effectiveness.

Overview

Figure 1:
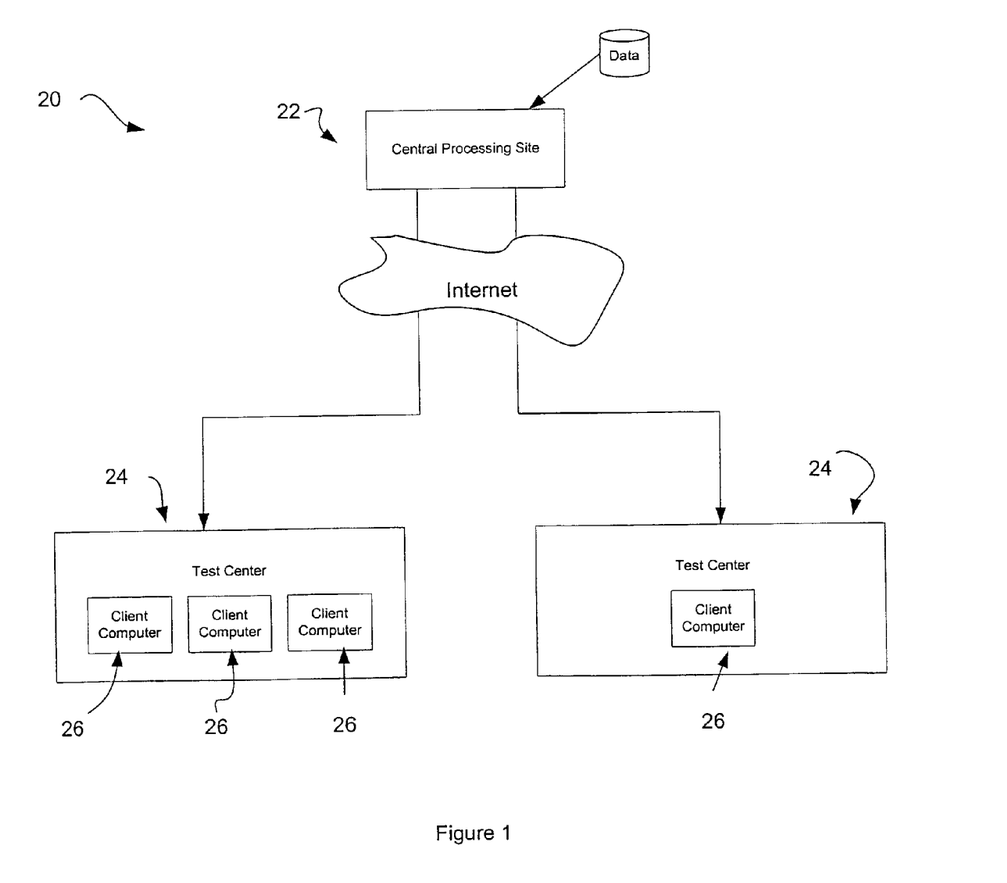
FIG. 1 illustrates a typical testing system.

Referring to FIG. 1, testing system 20 is depicted. The central processing site 22 provides centralized storage of testing and registration information and controls the overall operation of the testing system. The computerized tests are developed at the central computer and delivered to at least one remote test center 24. Each test center 24 includes at least one workstation (client computer) 26 on which a candidate takes the computerized test. In a preferred embodiment, the workstation is a personal computer equipped with a mouse and a keyboard. The software running is a WWW browser.

Test centre 24 may be a dedicated test site or a school or university. Generally a proctor is located at each test site to administer the examination. The proctor, or any other authorized person, can set up the examination from the central processing site for the candidate. Answers are submitted by the candidate to the central processing site. No information is stored at the remote site.

In a preferred embodiment, the examination is an Internet based test, requiring all transactions to be done via the Internet.

The central processing site includes a central computer with a web server for transmitting examination questions, receiving and storing submitted answers and performing both pre and post processing functions. It may further include routines for generating the examination user interface.

The examination questions are stored in a database located at the central processing site. The examination questions are taken from the central web server at the central site. Instead of being stored in a flat file, the questions are stored on the server in a relational database (item bank), from which they are drawn and manipulated by the software. As questions are extracted from the database and administered to the candidate, the server records this information in an individualized cookie that is returned to the client with the examination content. In this way, when handling future transactions, the server is able to quickly determine what questions have been asked and what questions are still available to ask. The method of creating, designing and maintaining the database is well known in the art and is not further described here.

Data and Data Transfer

Figure 2:
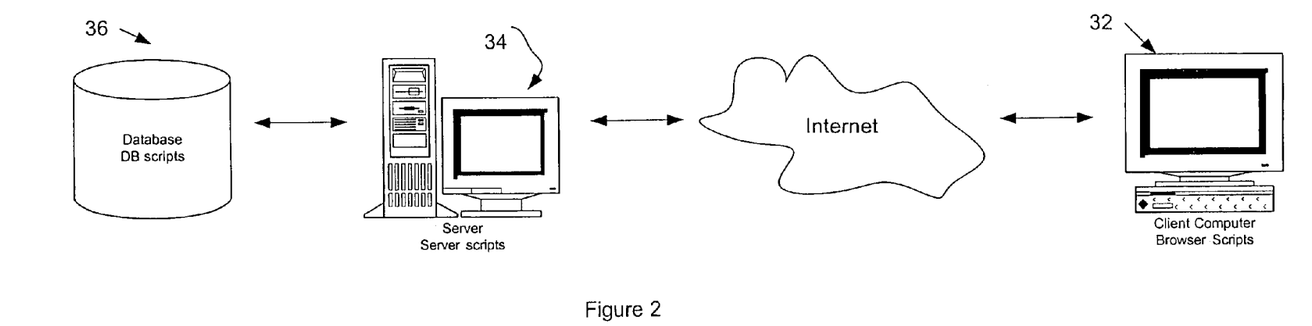
FIG. 2 illustrates the data transfer between entities of the system of FIG. 1.

Referring to FIG. 2, client 32 of the system preferably runs a custom browser program in Java Script and Java. Server 34 preferably runs a custom server based program in Perl, while the item bank is organized in a SQL database 36 that runs custom database scripts.

The data transfer occurs both ways across the three software modules. The three modules can either be on different physical machines or be on the same machine. In either configuration, however, all three modules are needed for complete data transfer.

In response to a submission by a client computer 32 (for example: a computer in a university computer lab), server 34's software programs interrogate database 36 to retrieve the examination content, formats it and sends it over the Internet to the client. While the candidate is working on a particular section of the examination, the custom browser scripts control the environment. The client/server system is typical in the art.

Cookies are also transferred between the web server and the client computer. A cookie is an HTTP header that consists of a text-only string that includes client information during a client/server session. Cookies store information about a client/sewer session in the client's web browser.

This cookie is maintained in the client machine's memory and may even be stored on disk. It is sent back to the server in the header of request if the conditions specified when the cookie is set (ie: expiry, domain, and path) are met.

In an examination session with multiple client computers, each candidate is assigned individual log file and cookie jar file names. In this way, each candidate's examination session is recorded individually.

Security Features

There are three aspects to security in delivering a web-based examination. First, the server must be secure from outside or inside tampering. Second, the information being sent over the Internet must be secure. Third, the remote examination site must be controlled to eliminate the possibilities of any form of cheating.

Figure 4:
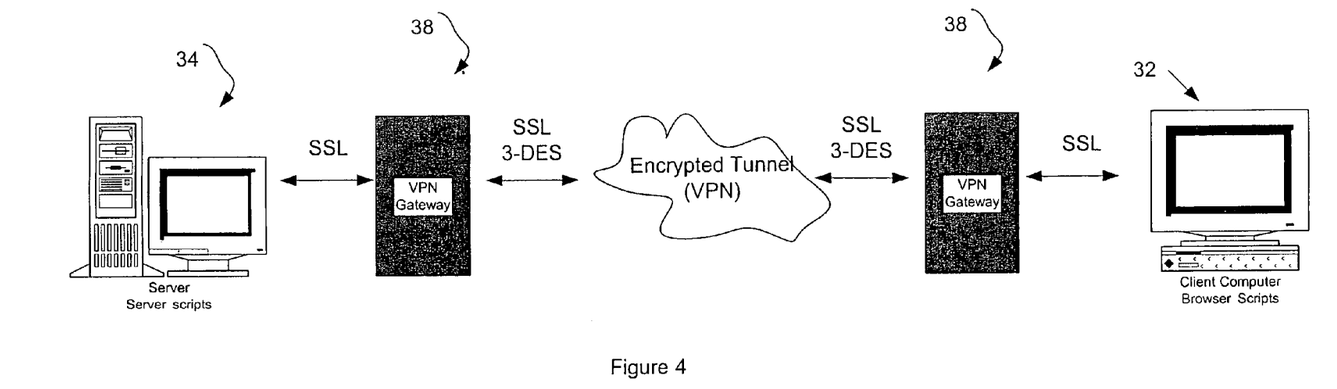
FIG. 4 illustrates security measures for data transfer for the system of FIG. 2.

In the second case, security is maintained between the various data transaction routes by using encryption. To ensure that the information being sent between the central server and the computers in remote examination locations is secure, a two-step approach is employed. Referring to FIG. 4, first, all the information sent from central server 34 is SSL-encrypted. The examination is administered over a secure socket layer (SSL). When an SSL session is started, the browser in client computer 32 and the server 34 exchange and verify digital certificates and public keys. Then the browser generates a session key, encrypts it with the server's public key and sends it to the server. This session key is used to encrypt and decrypt the data sent between the browser and the server in that session. At its highest level, Secure Sockets Layer is an 128-bit encryption scheme. An SSL session is signalled in the browser by the closing of an icon of either a lock or a key in the status bar of the browser. In addition to this encryption, virtual private networks (VPNs) 38 are established between the central server 34 and each of the remote locations (client computers 32). A VPN (Virtual Private Network) is established between two VPN gateways. A VPN erects a "tunnel" over the public Internet through a special method of encrypting and rewrapping packets. All transactions are authenticated through the transmission of digital certificates. A hardware-based VPN may be used, which means there is a physical box, a VPN gateway, in each location. A software-based VPN may also be used. In a preferred embodiment, the VPNs use "triple-DES" encryption, a 56-bit encryption scheme employed three times consecutively. The end result is that all the information leaving the central server is encrypted once using SSL and then three more times using DES. The resulting stream of data cannot be interpreted by a third party. The VPNs are set up only during testing periods. The VPN gateway on the client side may be replaced with commercial software.

By combining two encryption technologies, a secure testing environment is achieved.

In terms of security at the remote examination location, there are number of physical safeguards. For instance, candidates are issued individual photo ID cards and must sign in. Examinations are proctored and no candidates is allowed from the room unescorted while an examination is in progress.

Scheduling

In a preferred embodiment, the examination includes a scheduling program for scheduling the candidates in a particular time and place for the examination. The candidate is required to preregister for the particular session desired. A PIN is assigned to the candidate which is linked to the time and place specified. Each candidate enters their PIN in order to log on the network. The data is then transferred to the test server where the PIN is either validated or invalidates. If it is validated, the candidate is allowed onto the network. If the user name is invalidated, then the candidate is not allowed onto the network.

The PIN prevents a candidate from taking an examination at a time and place that deviates from the pre-registered time and place. The scheduling feature also ensures that examinations will not be over or double booked.

Examination Administration

Figure 3:
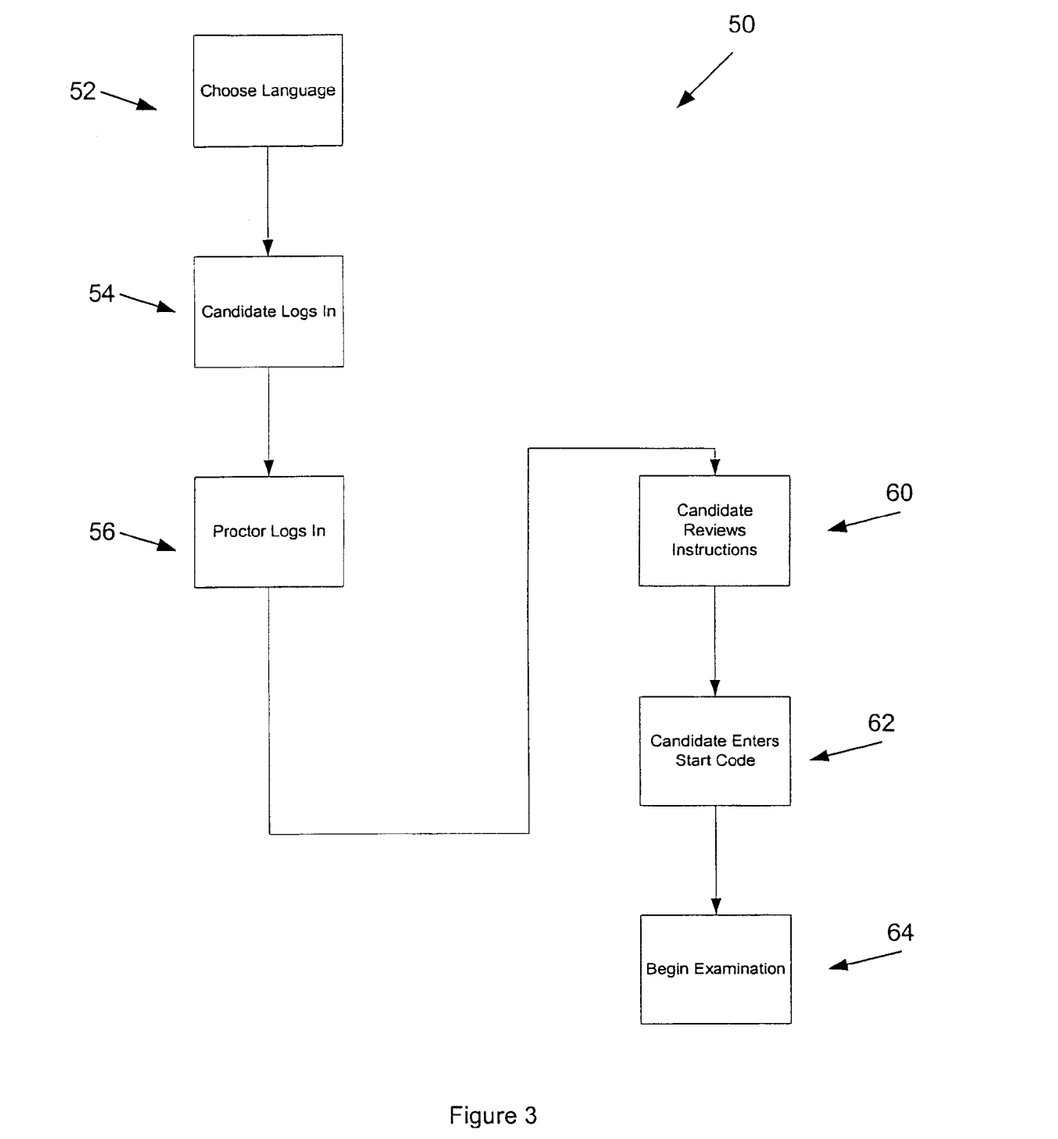
FIG. 3 illustrates a method of administering an exam according to the present invention.

Once the candidate has been admitted to the examination room and assigned to a computer, the following steps, illustrated as method 50 of FIG. 3, are taken. In step 52, the candidate is able to choose a preferred language. In the preferred embodiment, the options are English and French. In step 54, the candidate logs in by entering an unique user name and PIN number. Each individual PIN number is reassigned for each session and will only access the examination on one particular day and test site.

The encoded PIN is checked to make sure the candidate is in the right location on the right day. Once the candidate part of log-in succeeds, the candidate's photo is displayed on the screen. In step 56, a proctor verifies the identity of the candidates against the on-screen photo and completes the log-in using his or her own ID and PIN. Steps 54 and 56 provide authentication of the candidate taking the particular examination. In step 60, the candidate is free to read the instructions for the examination but cannot start until the day's start code is announced, which is preassigned and unique to each session (see below). A proctor will announce the start code only once all candidates are successfully logged in. It is the equivalent of a proctor saying "You may now turn over your papers."

Each candidate then enters the start code in step 62 and the examination begins in step 64.

Daily Start Code

The start code is a computed value that is different for every examination session. The start code algorithm is a routine that creates two apparently unpredictable four digit codes from the current day's date.

The proctors are given a list of the start codes for each day of the examination by secure encrypted email.

Unidirectionality of Examination

Figure 5:
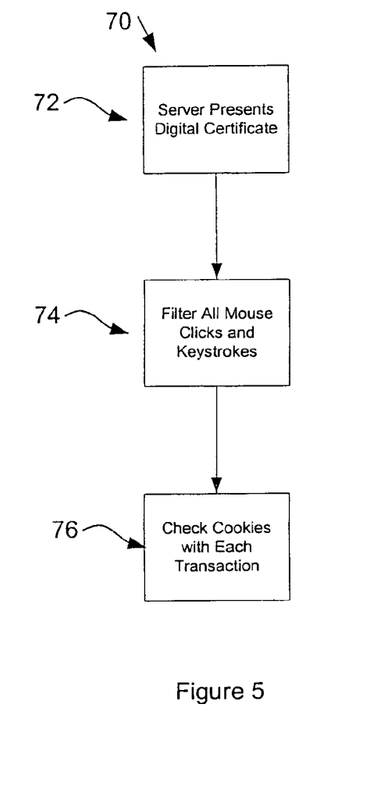
FIG. 5 illustrates the unidirectionality of the examinations according to the present invention.

Since, in the preferred embodiment, the examination is administered via a web based application, provisions are made to create a linear environment within the application. The browser features are disabled to prevent candidates from returning to previous pages in the examination. A disadvantage of using a web browser as the client part of a Internet based examination is that the web is designed to allow non-linear hypertext navigation, enabling the user to follow any hyperlink offered and to jump back and forward among pages already visited. In a high-stakes examination firm control over navigation must be maintained. To ensure that candidates progress through the examination in a precise linear fashion, a number of features are incorporated to control the process as illustrated in FIG. 5 as method 70. First, in step 72 the server 34 presents a digital certificate, which allows the software in client computer 32 to request additional privileges that are not normally allowed to client-side scripts, specifically the right to create a full-screen, top-level window that bars access to the desktop and cannot be exited, and to disable the normal hot keys that allow users to navigate backwards and forwards and to invoke a variety of other functions. Second, in step 74 all mouse clicks and keystrokes are filtered to allow only those appropriate to reach the browser in client computer 32. Third, in step 76, the cookies are checked with each transaction to ensure that the candidate's session is where it is supposed to be.

Adaptive Nature of the Exam

The custom server-side software allows the examination to be adaptive if required. The software can be implemented in an examination that is adaptive, non adaptive or a mixture of both. The following describes a preferred embodiment for implementing adaptive testing.

Adaptive testing configures each test and set of questions to suit each candidate. Examination questions asked are chosen from the item bank based on the response to previously answered questions.

The adaptation may operate simultaneously in one than more dimension. For example, in medical testing, adaption may occur in parallel for several medical disciplines.

In a preferred embodiment of an adaptive examination, the questions are arranged in a series of sections. Each section of questions is balanced for content. Candidates that perform very well within a section receive slightly more difficult questions in the next round. Candidates that perform very poorly receive slightly easier questions in the next section. Other candidates receive questions of similar difficulty in the next section. The differences in difficulty from one section to the next are small. The overall aim is to provide an optimal test for each candidate.

In a preferred embodiment, each candidate gets exactly the same number of questions. Each candidate also receives a equal number of questions in each section as determined by the examination blueprint. All candidates will be administered a different test, but because all of the items have been calibrated to the same scale, it will be possible to locate the candidates on that scale using the procedures described below.

In a preferred embodiment, an adaptive examination is divided into groups of questions (sections). The candidate provides answers to each section and submits the entire section to the central server. The server software then marks each section of questions and responds with a new section of questions based on the answers provided. In this way, the adaptive testing means is not based on individual questions, where each question asked is chosen based on the answer of the previous question. But rather, the next section of questions asked is chosen based on the answers of the previous section of questions. Scores are determined by weighting candidate's responses to the questions that they answer. The weight of a question is based upon its difficulty and how well it separates passing and failing candidates. This process is known as calibration. The final score is determined both by the total number of question answered correctly and the weight that are associated with those questions. The candidate who answers a greater number of questions correctly with higher weights will receive a higher score.

Adaptive testing provides each candidate equal opportunity to demonstrate his abilities. The computer selects test questions based on the candidate's responses. If the candidate is unable to answer questions in a particular area at a particular ability level, the computer will adjust the difficulty level accordingly. The computer will always give the candidate the opportunity to better himself as the examination continues.

Adaptive Testing Algorithm

Having a true relational database allows a form of adaptive testing using item-response theory to be implemented. A testlet is a group of four items that always occur together. Each item belonging to a given testlet is of the same difficulty level and from the same discipline. These four questions always appear together in the same section of the exam. However, the order of all questions in a given section is scrambled. In the examination, candidates are presented with a section of preferably 24 questions consisting of one testlet from each of six disciplines. Within the section of 24 items, candidates are free to move back and forth among the questions and change their responses. Once a candidate is satisfied with the section, he or she submits the section, and can no longer gain access to it.

All of the items in the bank have been placed into 4 groups according to their location parameters: very easy (level 1), easy (level 2), moderate (level 3), and difficult (level 4). There are two kinds of testlets, routing testlets and adaptive testlets. These will be discussed in turn.

A routing testlet consists of four items from a single testing discipline with one item from each difficulty level. The items in the routing testlets have as many highly discriminating items as possible. Adaptive testlet consist of four items from a single discipline and from a single difficulty level. Within these constraints, the content of items within both routing and adaptive testlets is balanced.

Figure 6:
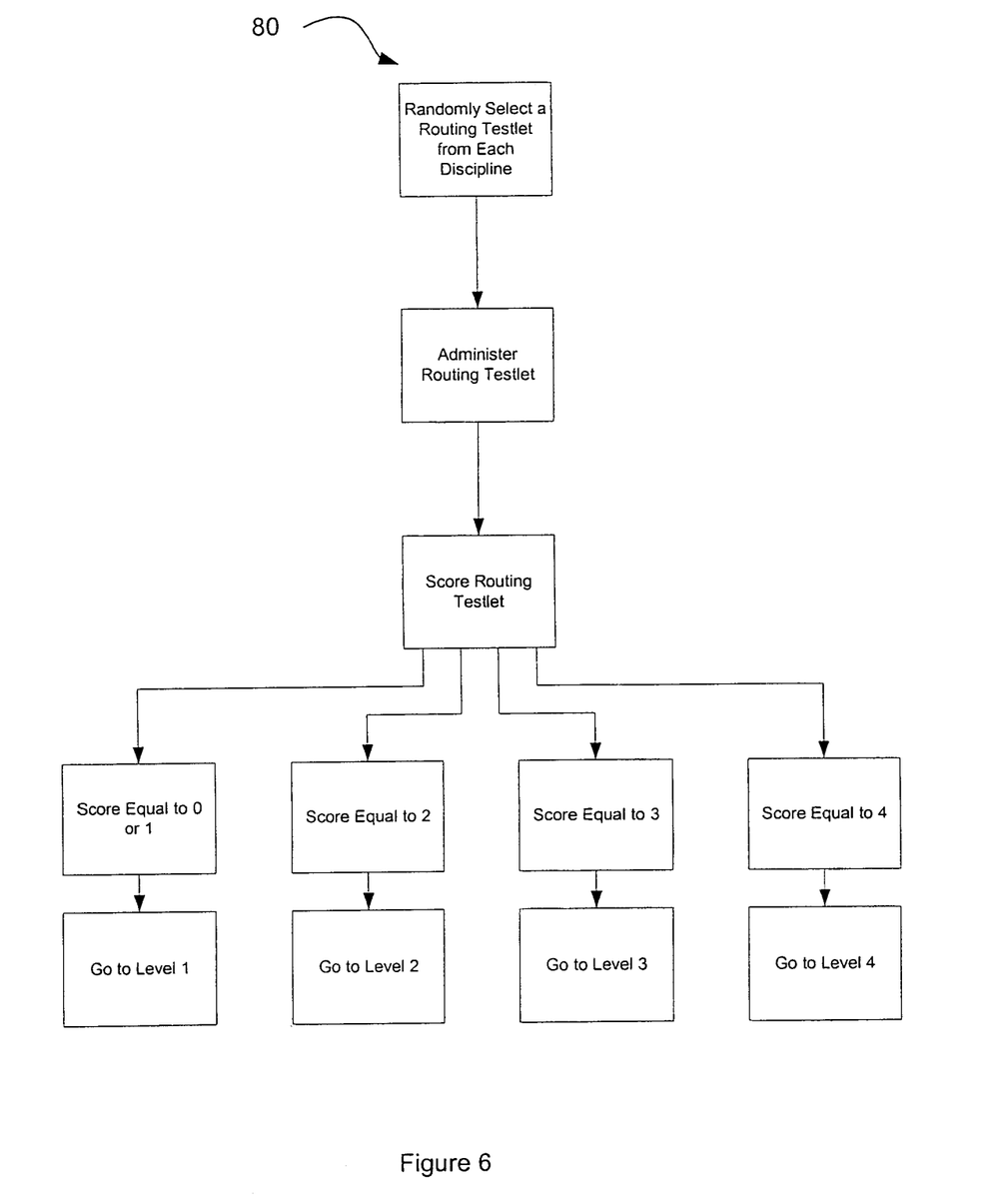
FIG. 6 illustrates the rules for administering routing testlets.
Figure 7:
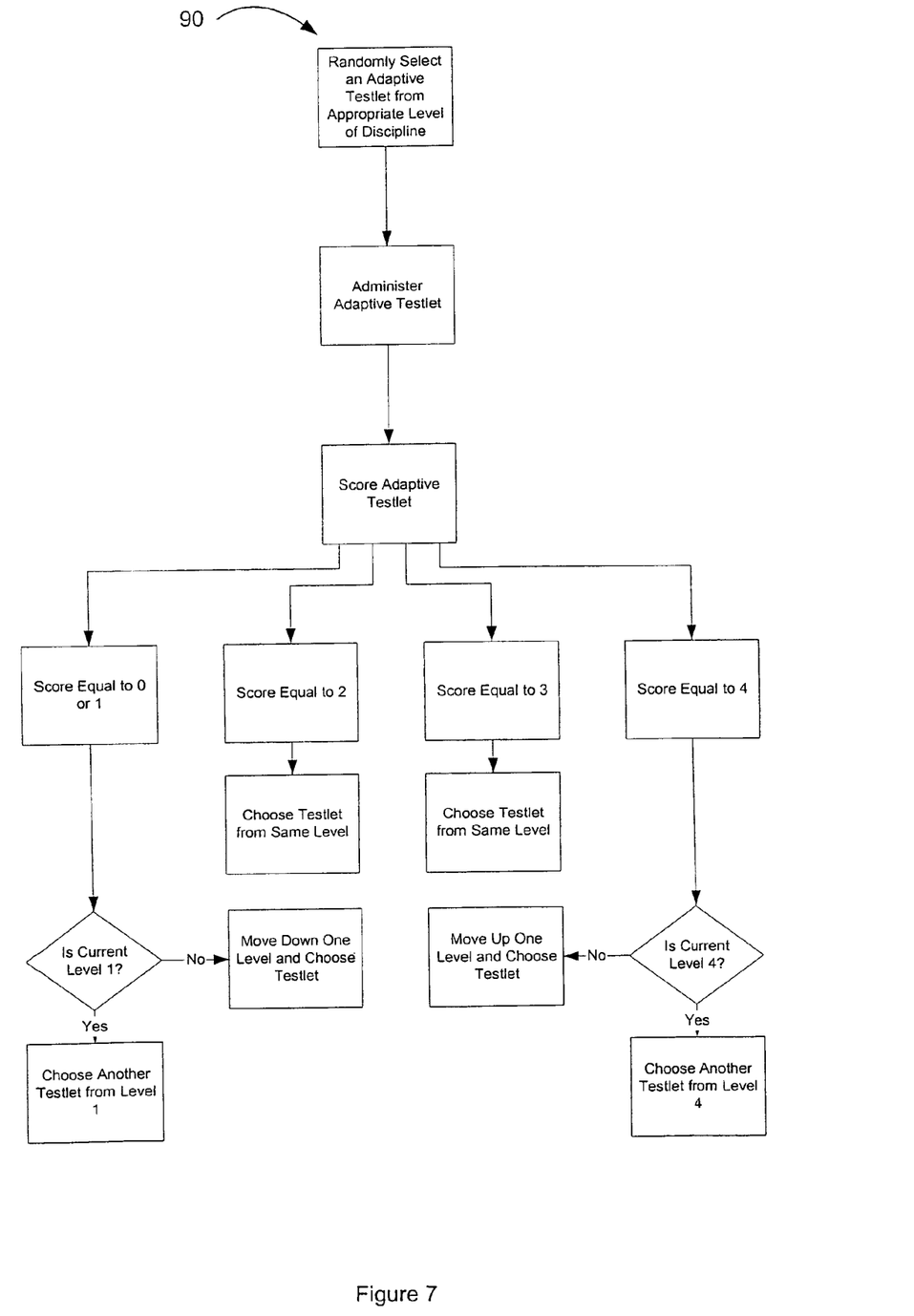
FIG. 7 illustrates the rules for administering adaptive testlets.

The preferred rules for adaptive testing are shown in FIGS. 6 and 7. The adaptive feature of the test is carried out within disciplines. Every candidate receives a total of 168 items, 28 from each discipline. As noted earlier, items are administered in sections of 24 questions consisting of a testlet from each of the six disciplines. Referring to FIG. 6 and method 80, the first section consists of a randomly chosen routing test from each discipline. Based on the results of the routing test candidates are assigned to adaptive testlets at specific levels. Referring to FIG. 7 and method 90, this means that in a section, a candidate could receive a level 1 testlet for Discipline #1, a level 3 testlet for Discipline #3, a level 32 testlet for Discipline #4, etc. From the candidate's perspective, the 24 items in a section will be randomly ordered.

The adaptive nature of the examination requires that the examination be marked in real time. When a candidate's answers to a section of questions are received at the central server, the program retrieves the correct answers for those questions from the database and marks the answers received. On the basis of how many questions were correct, the program assigns the candidate a new difficulty level. If the adaption is multidimensional, new difficulty levels will be assigned for each dimension. The program then selects questions or groups of questions at the appropriate level of difficulty, retrieves the questions from the database, scrambles their order (and the order of their options), formats them appropriately, and returns those questions to the candidate as the next section of the examination.

Maintaining State in HTTP Transactions

In a preferred embodiment, individual sessions are created by maintaining transaction state. This feature is especially useful in IBT since a number of unforeseen events can occur causing the workstation to go offline. In the case of adaptive examinations, maintaining state is important since subsequent questions posed to a candidate are dependant upon answers to previous questions. In order to ensure that the candidate's work is not lost in such an event, the administered questions are recorded in log files at the server in real time. If an event occurs that disconnects the workstation from the server, the candidate can log on again and resume the examination from the same spot.

One of the strengths and weaknesses of HTTP (World Wide Web) transactions is that they are inherently stateless. This means that each request from a client web browser to a remote server for a particular resource is entirely separate from any transactions that preceded it, and the server knows nothing about what the client was doing before.

Statelessness is a strength in HTTP transactions because precious resources are not consumed by having to maintain a persistent connection. It is a weakness, however, when a transaction is part of a longer-tern session requiring persistent information. There are several ways to maintain state in browser-server transactions. One of these is the use of cookies.

However, the problem faced with the standard use of cookies is that client machines may crash in the middle of an examination and have to be rebooted, which would destroy the cookies held in memory. Even if the cookies are stored locally on the client's hard disk, a candidate might be moved to a new machine. That would mean that all the answers a candidate had made in the current section of the examination would be lost, since that information had not been sent to the server.

The current invention includes a program that regularly saves the current state of each examination session (including questions and answers) on the server. At regular intervals (preferably 60 seconds), the client browser automatically initiates a special request to the server, which causes cookie information to be recorded in a unique file. The unique file, referred to as the "cookie jar" file, thus holds a complete record of a single session in the form of 60 second snapshots. This file can then be used to reconstruct a session in its entirety or to restore a session to the same state in the event of a malfunction regardless of where the candidate is located or relocated.

Figure 8:
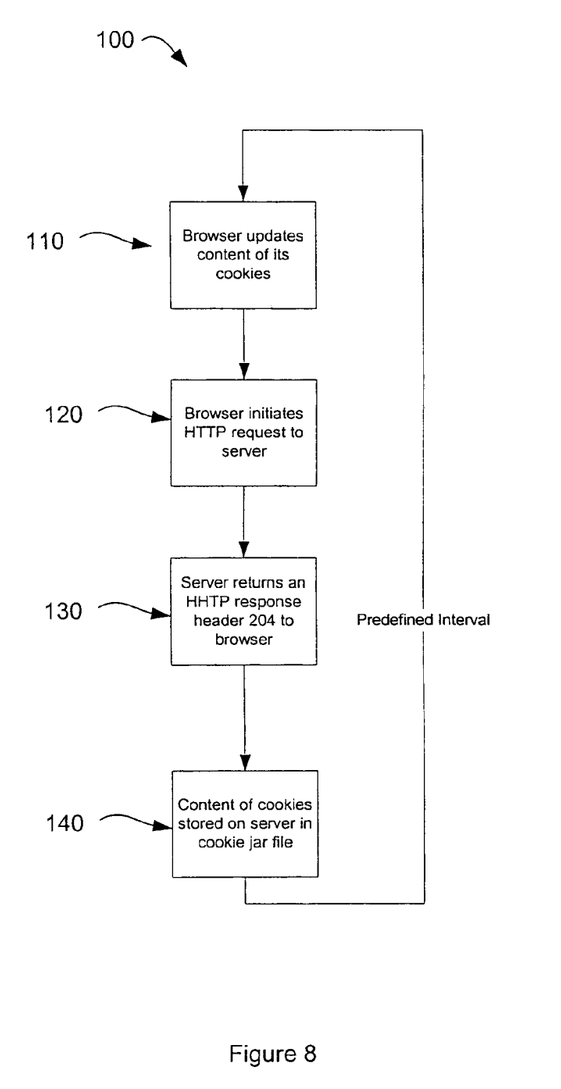
FIG. 8 illustrates the algorithm for maintaining state according to the present invention.

All the cookie information received at the server is stored in a candidate-specific "cookie jar" text file. When a special request is received from the browser, the server sends back HTTP response header 204, which tells the client browser that the request has been completed but that the displayed content should not change. Thus the user is completely unaware that the browser is regularly connecting to the server to enable current information about the session to be stored. The data in the cookie jar file captures the state of the exam at a particular interval, which in a preferred embodiment is 60 seconds.

In the event of a computer malfunction, a candidate's session can be restored to exactly the same state (with a maximum discrepancy of 60 seconds). As soon as the candidate logs in again, the program offers to restore the examination in progress and does so by combining the information stored in the regular log file with the last entry in the cookie jar file for that particular candidate. The other thing the cookie jar files are useful for is tracking exactly what occurred in a particular session. For instance, it is possible to recreate 60-second snapshots of what answers the candidate selected. In other words, it is possible to recreate a candidate's entire response record.

The program is now detailed following the illustration of FIG. 8 and the provided pseudo-code.

[client program]
x=60
every x seconds
update cookies
request cookie-jar program

```
repeat
  [server cookie-jar program]
  parse cookies received from client
  return HTTP 204 header to client
  close standard output
  construct filename based on candidate ID and current date
  open file
  append cookie information to file
  close file
```

The program is preferably programmed in JavaScript on the client side and Perl on the server side, but any such suitable language could be used.

Referring to FIG. 8, in the step 110 of method 100 for the creation of the cookie jar file, the browser updates the content of its cookies, recording a variety of information about the current state of the examination, including the answers so far selected by the candidate. In step 120, the browser initiates a normal HTTP request to the server, which inherently includes all cookie information. In step 130, the server returns an HTTP response header 204 to the browser, indicating that the currently displayed content should not be changed. In step 140, the content of the cookies is stored on the server in a unique cookie jar file. The cycle repeats at 60 second intervals.

English-to-French transition

As previously mentioned, the examination is preferably offered in English and French. However, the examination can be programmed to be offered in any language(s). Although candidates are asked to select a language at the beginning of the examination session, they are able to switch languages at any point once the actual examination is under way. The examination preferably includes an option to allow the candidate to switch between languages during the course of the examination. Since the examination is dynamic, meaning that each candidate has a different set of questions on the screen, the software is required to regenerate the current section of the examination in the other official language, preserving question order, option order and answers in the process.

Again, cookies are the underlying mechanism that makes this possible. Cookies are easily parseable (at the server end) since they do not require disk access and since they are part of the submission by the candidate. Cookies are also more quickly analyzed than a look up table, which is slow and problematic.

User Interface

Figure 9:
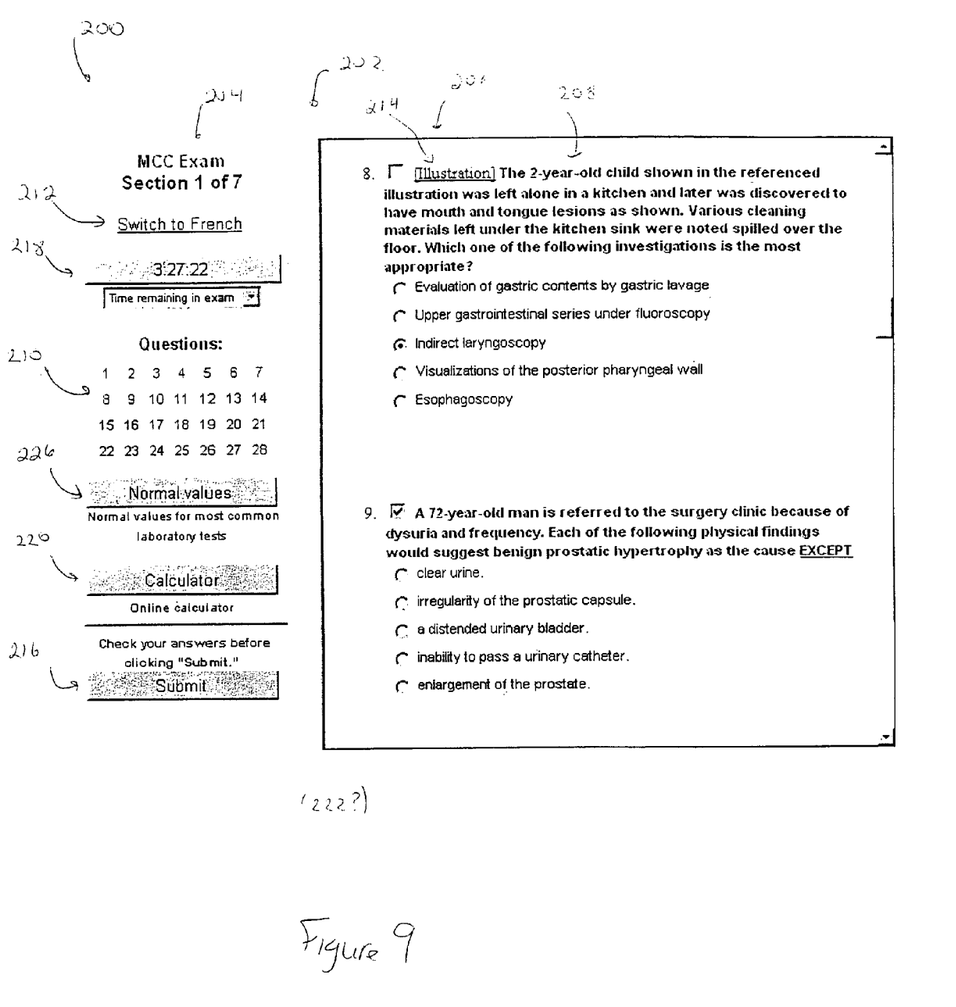
FIG. 9 illustrates a user interface used in the present invention.

Referring to FIG. 9, the user interface 200 where the questions are presented consists of main frame 202 divided into two frames: a left frame 204 with tools and navigation aids, and a right frame 206 with a question display window 208. The questions are displayed in the display window 208 along with an area for the candidate's response. If the question is multiple choice or a question where the candidate must make a selection from a list of answers, then these are displayed here as well. In some instances, the question may refer to an illustration, photograph or chart or the like. This graphic may appear in a separate, floating window in response to a mouse click.

The left frame 204 includes a number of features, all meant to enhance the user interface. In a preferred embodiment, the left frame 204 includes a listing of question numbers 210. A click on a number brings that question to the top of the question display 208. As questions are answered, the corresponding question numbers in the list turn red. If the candidate wishes to flag a particular question, he or she can select the check box next to the question and the question number highlights. Thus the list 210 allows the candidate to quickly review which questions have been answered, which are remaining to be answered, and which are flagged for review.

In the event that the monochromatic screen is chosen as the display on the user interface, any highlighted numbers in the listing of question number will simply show as a white back ground and the red will show as bold font instead.

Other tools in the left frame include: a clickable link to activate the program to switch between English and French 212, a button to switch the user interface between a colour screen and a monochromatic screen (not shown) and, a button to submit the answers to the questions 216. A clock 218 is also programmed to appear in the left window. The clock can either display real time, examination time elapsed (per section) or examination time remaining. The clock can also be deactivated.

The left window also includes links to reference material allowed by the examination administrator such as a calculator 220 and common reference data 226.

A text size option is also included allowing a candidate to customize the screen text size as per their liking.

The user interface may also provide for changing background colours from section to section. This dynamic background helps eliminate candidate tiredness.

As previously mentioned, the user interface is displayed in a web browser with the browser features customized to ensure that examination in linear.

An advantage of an embodiment of the invention is that it can be administered securely from any suitable computer lab or individual computer.

An advantage of an embodiment of the invention is that the examination provides a faster turnaround of results.

An advantage of an embodiment of the invention is that it provides a more efficient interface for the candidate, reducing the chance of error.

An advantage of an embodiment of the invention is that it reduces the risk of cheating since every examination is different.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of securely administering an examination by computer, comprising the steps of:
   (i) preparing examination content, including:
      a. formulating examination content within individual questions;
      b. creating a plurality of testlets, each of said testlets comprising a grouping of one or more of said questions; and
      c. storing said testlets within a database;
   (ii) logging an examinee into a client computer module, including:
      a. prompting entry by said examinee of provided registration information through a user interface incorporated within said client computer module;
      b. capturing said entered registration information on said client computer module;

c. transmitting said captured registration information to a server computer module over a secure data transmission route;

d. verifying said transmitted registration information; and e. logging said examinee into said examination upon said verification;

(iii) displaying examination content to said logged in examinee, including:

a. retrieving from said database by said server computer module, individual testlets appropriate for said examinee in accordance with at least one criterion associated with said examinee;

b. transmitting said retrieved testlets to said client computer module over a secure data transmission route; and c. displaying said transmitted testlets to said examinee on said user interface;

(iv) capturing and recording responses from said logged in examinee to said displayed examination content, including:

a. capturing responses to said displayed testlets from said examinee entered through said user interface;

b. transmitting said captured responses over a secure data transmission route to said server computer module; and c. recording said transmitted responses on said server computer module;

(v) limiting interaction with said client computer module by said logged in examinee to sanctioned examination interactions only, including:

a. locking display of said user interface on a display screen displaying said user interface, above all other elements of said client computer module, and to an entirety of said display screen;

b. preventing access by said examinee to elements of said client computer module underlying said user interface;

c. filtering out non-sanctioned commands inputted from input devices of said client computer module; and d. controlling navigation by said examinee linearly within said user interface to control progress through said examination; and (vi) iterating steps (iii) through (v) until completion of said examination.

2. The method according to claim 1, wherein said step (v) further includes the step of verifying examination position information to ensure said examinee is actually where they are authorized to be within said examination.

3. The method according to claim 2, wherein said step of verifying examination position information includes the step of recording said examination, including:

at said client computer module,
recording at regular intervals on cookies, current state information pertaining to said examination of; and
initiating a record request to said server computer module, at said server computer module,
storing content of said cookies in a file allocated to said examinee in response to said request.

4. The method of claim 3, further including the step of initiating a request from said server computer module to said client computer module to prevent currently displayed content on said client computer module display from changing, after said server computer module has received said record request.

5. The method according to claim 1, wherein said step (iv) further includes the steps of:

submitting responses to a predetermined set of said testlets by said examinee upon completion of said responses, and preventing said examinee from changing said submitted changes.

6. The method according to claim 1, further comprising the step of including a Public Key Infrastructure (PKI) with at least one of said secure data transmission routes.

7. The method according to claim 1, further comprising the step of establishing a Virtual Private Network (VPN) in at least one of said secure data transmission routes.

8. The method according to claim 1, wherein said registration information includes a Personal Identification Number (PIN) assigned to said examinee, and associated with a time and a place of said examination.

9. The method according to claim 8, wherein said verification step includes the step of verifying whether said examinee logs into said examination at said place and on said time.

10. The method according to claim 1, wherein step (ii) further includes the steps of:

entering a verifier information by a proctor, and transmitting said entered verifier information to said server computer module over a secure data transmission route, whereby said step of verifying said transmitted registration information is aided by said transmitted verifier information.

11. The method according to claim 10, wherein step (ii) further includes the step of displaying a digital likeness of said examinee on said client computer module for verification by said proctor prior to said step of entering said verifier information.

12. The method according to claim 10, wherein said step (ii) further includes the step of entering a provided start code by said examinee subsequent to logging into said examination.

13. The method according to claim 12, wherein a first testlet is provided to said examinee when said start code is entered.

14. The method according to claim 1, further comprising the step of automatically marking said examinee responses.

15. The method according to claim 14, further comprising the step of adaptively retrieving said testlets in accordance with said automatically marked responses.

16. The method according to claim 1, further comprising the step of providing free movement to said examinee between individual questions within a single section, said section comprising one or more testlets selected in accordance with said at least one criterion.

17. The method according to claim 16, wherein said step of providing free movement includes the step of allowing said examinee to change responses to said questions within only a single section prior to submitting said responses to said section.

18. The method according to claim 1, wherein said testlets comprising a predetermined number of said questions that are from the same medical discipline and about the same level of difficulty.

19. The method according to claim 18, wherein said step (i) further comprises the step of:

creating separate routing testlets and adaptive testlets;

wherein said step (iii) further comprises the steps of:

displaying said routing testlets first, to estimate examinee ability; and subsequently adaptively displaying said adaptive testlets to said examinee based upon results from said examinee's said routing testlet responses.

20. The method according to claim 1, further comprising the step of providing language transition from one language to another at any point within said examination.

21. The method according to claim 1, further comprising the step of enabling changes to display of visual elements within said user interface by said examinee, including text and background appearance to minimize examinee fatigue.

22. The method according to claim 1, further comprising the step of providing a clock, on said display, adapted to display real time, examination time lapsed, and/or examination time remaining.

23. The method of claim 1, wherein step (v) further includes the step of providing a digital certificate to said client computer module to ensure a software in said client computer module to transact a process allowed by said server computer module.

24. A system for securely administering an examination by computer, comprising:
- a database for storing a plurality of testlets including formulated examination content within one or more examination questions;
- a server computer module communicated with said database by a secure data transmission route for retrieving from said database said testlets;
- a client computer module connected to said server computer module by a secure data transmission route, said client computer module including:
- a display screen connected to said client computer module;
- a user interface incorporated within said client computer module and displayed on said display screen; and
- an interaction limiter module, said user interface being adapted for:
- prompting and capturing entry of registration information by said examinee; and
- displaying testlets and capturing examinee responses to said displayed testlets, said interaction limiter module being adapted for:
- locking display of said user interface on a display screen displaying said user interface, above all other elements of said client computer module, and to an entirety of said display screen;
- preventing access by said examinee to elements of said client computer module underlying said user interface;
- filtering out non-sanctioned commands inputted from input devices of said client computer module; and
- controlling navigation by said examinee linearly within said user interface to control progress through said examination.

* * * * *